United States Patent [19]

Friedli et al.

[11] 4,345,048

[45] Aug. 17, 1982

[54] BROMINATED CYCLOALIPHATIC (METH) ACRYLATE COMPOSITIONS

[75] Inventors: Hans R. Friedli, Lake Jackson; Clinton J. Boriack, Freeport, both of Tex.

[73] Assignee: The Dow Chemical Company, Midland, Mich.

[21] Appl. No.: 113,914

[22] Filed: Jan. 21, 1980

[51] Int. Cl.$^3$ ............................................... C08F 8/00
[52] U.S. Cl. ...................................... 525/192; 525/31; 525/39; 525/44; 525/48; 525/107; 525/244; 525/289; 525/290; 525/356
[58] Field of Search ............... 525/244, 210, 290, 289, 525/356, 192; 526/283

[56] References Cited

U.S. PATENT DOCUMENTS 3,143,535  8/1964  Jackson, Jr. et al. ............... 526/282

Primary Examiner—J. Ziegler
Attorney, Agent, or Firm—B. G. Colley

[57] ABSTRACT

Brominated cycloaliphatic (meth) acrylate compositions are prepared by the reaction of bromine at a temperature in the range from −30° C. to 50° C. with compositions made by reacting (meth) acrylic acid with dicyclopentadiene compositions in the presence of a Friedel-Crafts catalyst such as $BF_3$.

The brominated compositions are useful to make copolymers which find use as metal coatings, laminates, ultraviolet light curable coatings and the like.

3 Claims, No Drawings

BROMINATED CYCLOALIPHATIC (METH) ACRYLATE COMPOSITIONS

BACKGROUND OF THE INVENTION

This invention relates to brominated cycloaliphatic (meth) acrylate compositions which are the complex reaction products of bromine with cycloaliphatic (meth) acrylate compositions.

It is known from Ser. No. 951,416 filed Oct. 13, 1978 now U.S. Pat. No. 4,319,009 that cycloaliphatic (meth) acrylate compositions can be produced by reacting dicyclopentadiene (DCPD) or DCPD concentrations with acrylic acid or methacylic acid in the presence of a Friedel-Crafts catalyst such as $BF_3$.

The preparation of 2,3-dibromodicyclopentenyl acrylate is known from U.S. Pat. No. 3,143,535 dated Aug. 4, 1964. The dibromo compound is produced by an inefficent synthetic route involving the sulfuric acid catalyzed addition of water to DCPD to give DCPD alcohol, bromination of the alcohol, and finally the acid catalyzed esterification of acrylic acid with the brominated DCPD alcohol.

It is known from Ser. No. 62,198 filed July 30, 1979 that chlorinated cycloaliphatic compositions can be prepared.

The present invention is superior to the above chlorinated cycloaliphatic compositions in that it renders polymers more fire resistant. The present invention is also superior to the known 2,3-dibromo dicyclopentadiene acrylate in that resins cured with the compositions of this invention show faster hardness development rates. Finally, the process for the preparation of 2,3-dibromodicyclopentadienyl acrylate described in the present invention is superior to the known process in that it is more efficient in the number of process steps and in the use of DCPD and bromine.

SUMMARY OF THE INVENTION

The brominated cycloaliphatic (meth) acrylate compositions of this invention comprise, the reaction product of bromine with a cycloaliphatic (meth) acrylate composition wherein the mol ratio of bromine per mol of cycloolefinic unsaturation is in the range from 1:1 to 1.1:1 and the composition before bromination has (A) about 60 to 95 percent by weight of dicyclopentadienyl acrylate, dicyclopentadienyl methacrylate, or mixtures thereof, (B) about 2 to 15 percent by weight of a mixture of polycyclopentenyl acrylates of the formula

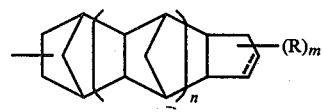

where
R is $CH_2=CZC(O)-O-$
Z is H, or methyl
n is 1, or 2
m is 0 or 1 and when m is 0 there is a double bond present, in the cyclopentyl group.

(C) about 0.5 to about 21 percent by weight of a mixture of the copolymers of methacrylic acid or acrylic acid with adducts of cyclopentadiene with isoprene, piperylene, methylcyclopentadiene, or mixtures thereof, (D) about 0.05 to 10 weight percent of a mixture of polyacrylates having the repeating unit:

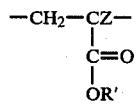

where R' is hydrogen or

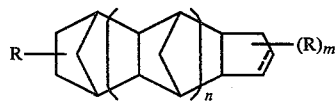

R is $CH_2=CZ-C(O)-O-$, Z is hydrogen or methyl, n is 0, 1 or 2, and m is 0 or 1, and when m is 0, there is a double bond present in the cyclopentyl group.

It is understood that the reaction product has substantially all the original acrylic unsaturation, substantially no remaining cycloolefinic unsaturation and which after bromination has 1 to 4 bromine atoms attached to the original cyclopentene ring and to the acid moiety.

Preferably, the range of dicyclopentadinyl acrylate or methacrylate ranges from 70 to 95 percent by weight. The range of polycyclopentenyl acrylates is preferably from 5 to 15 percent by weight. The range of methacrylic or acrylic copolymers is preferably from 0.5 to 15 percent by weight. The range of polyacrylates is preferably from 0.05 to 5 percent by weight.

In addition it is often desirable to distill the intermediate product, that is the acrylates of dicyclopentadiene before bromination, to obtain DCPDA as a substantially pure material, which then may be brominated without forming brominated polycyclopentenyl acrylates. While it may also be possible to distill the dibromodicyclopentadienyl acrylate from the reaction product of the bromination of the cogeneric mixture obtained on forming the acrylates from either pure or crude grades of dicyclopentadiene, the products are so high boiling as to make this route an extremely doubtful commercially viable practice.

The compositions of this invention are useful as comonomers in thermosetting resins or thermoplastics. They are also useful to form metal coatings with good adhesion, which are curable by ultraviolet light. The instant compositions have a pleasant odor and their polymeric products are odor free.

DESCRIPTION OF THE PREFERRED EMBODIMENTS

The main reactants to make the compositions of this invention are the products set forth in the aforementioned Ser. No. 951,416 which are referred to hereinafter as cycloaliphatic acrylates or CAC and CMC for methacrylate compositions. Thus the reactant compositions of the present invention are prepared by the addition of a peroxide free or peroxide inhibited DCPD to commercially inhibited acrylic acid (AA) or methacrylic acid (MAA) containing $BF_3$ catalyst. The reaction is performed in the presence of such unreactive solvents as toluene, carbon tetrachloride or heptane or without the use of solvent. The reaction temperature is maintained between 25° and 120° C. both by controlling the external heat source and the rate at which DCPD is added. Also a 0.1 to 4.0 molar excess of AA is used. Formation of insoluble polymers which cause emulsions to form during the subsequent wash process is prevented by keeping any metal surfaces exposed to the inhibited reaction products and/or reactants by using a spray nozzle and a recirculation pump drawing reaction product in admixture with fresh inhibited DCPD. The effectiveness of the inhibitor (monomethyl ether of hydroquinone) is maintained by using 1–5% and preferably 2% oxygen in the nitrogen pad. Care must be exercised not to exceed 5% oxygen since above this amount there is danger of explosions.

After the reaction of DCPD is complete (<0.2% as determined by chromatography), deionized water heated at 50°–90° C. is added to the reaction product (CMC/CAC). The two phase system is agitated, then allowed to phase separate and the aqueous phase is removed. The washing process is repeated until titration of the organic phase with base indicates residual acidity (related as weight percent acrylic acid) is less than 0.6%. After the product has been washed to the desired residual acidity, the product temperature is maintained at 25°–90° C. and a vacuum (2–250 torr) is applied to the reactor so that residual and dissolved water are removed by distillation. The yellow, bright clear liquid obtained has a moisture content of less than 3000 parts per million. The CAC product at this stage of the process is brominated to produce the brominated acrylate compositions of the invention or the CAC composition may be refined to a high purity DCPDA or DCPDMA which is brominated to yield the composition claimed in U.S. Pat. No. 3,143,535. Thus, the high purity DCPDA/DCPDMA is extracted from CAC/CMC by distillation using wiped film evaporation. For example, DCPDA (98.7% pure) is obtained when CAC is fed at a rate between 0.6 and 1.6 lb./hr/ft$^2$ to a wiped film evaporator operating under vacuum (less than 10 torr) and with exterior wall temperature between 136° and 150° C. and 25 to 50% of the feed is taken overhead. The high purity DCPDA overhead product is water white and can be brominated to give essentially the same 2,3-dibromoDCPDA of U.S. Pat. No. 3,143,535.

The CAC of CMC compositions (undistilled but refined reaction products of the copending application) are brominated with bromine in the gaseous or liquid form or as a solution in an inert solvent at temperatures in the range from about −30° to about 50° C. and preferably in the range −20° to 20° C. in the presence of an inert solvent to obtain the products of the present invention.

The mol ratio of bromine per mol of cycloolefinic unsaturation in the CAC or CMC compositions should be in the range from 1:1 to 1.1:1.

Amounts of bromine less than the above are undesired because the product of such reactions become intensely colored on standing if not inhibited against color degradation and because the products do not possess the desired high bromine content.

Amounts of bromine more than the above are undesired because excessive amounts of acrylic bonds are brominated, thus giving a product of lower reactively to vinyl polymerization.

Useful solvents are those that are not attacked by bromine under the reaction conditions and are easily removed. Examples are benzene and halogenated solvents, such as methylene chloride, carbon tetrachloride, chloroform, fluorocarbons, such as Freon®, e.g., Freon 11, 12, 21, 114.

If desired, the use of a solvent can be eliminated and bromine can be added as a liquid or as a gas entrained in a carrier such as air, nitrogen, helium, argon or the like. However, the reaction is more difficult to carry out because of poor mixing and inadequate heat removal, and the temperature must be raised to the range 0°–50° C. in order to reduce the viscosity. When no solvent is used, the product of the reaction can be used without additional processing.

When solvents are used in the bromination reaction, they are removed from the product by vacuum flash distillation, and the polymerization of the product during the distillation step is prevented or inhibited by use of a small amount of a polymerization inhibitor such as tertiary butyl catechol (TBC), hydroquinone, hydroquinone monomethyl ether or phenothiazine. Generally, about 50–300 parts per million of the polymerization inhibitor will be used. The polymerization of the product during the solvent stripping step is further prevented by the addition of styrene in the amount of 0.5–10 parts per hundred based on the finished product. Generally, one part per hundred is added. To inhibit color formation mono epoxides, such as tert-butylglycidyl ether or epichlorohydrin, or epoxy resins such as DER® 736, or DER® 331, may be added. Generally two parts of epoxide per hundred parts of brominated reaction product are added.

Though the product work-up procedure described above is the preferred one, many alternatives to this procedure are possible. For example, prior to solvent stripping the reaction solution can be water washed, or water washed and dried with a dessicant such as anhydrous Na$_2$SO$_4$, MgSO$_4$, CaO or molecular sieves. As another alternative, the product solution can be neutralized by washing with aqueous solutions of bases such as NaOH, KOH, Na$_2$CO$_3$, NaHCO$_3$, or NH$_3$. The neutralized solution can be stripped without drying or stripped after drying with a dessicant.

Product solutions that have not been treated or have been treated in any of the ways described above can be treated additionally with activated carbons, such as Norite® A or Pittsburg Activated Carbons, or acidic clays such as a commercially available Filtrol®. The spent treating agents, which are useful in improving product color, are removed by filtration before solvent stripping.

Product solutions that have become highly colored may be passed over columns of alumina or silica gel to upgrade their color. The column effluents without further processing can be vacuum stripped, or the effluents can be treated with activated carbons or acidic clays prior to being vacuum distilled.

The brominated compositions prepared herein are useful to make polymers in combination with unsaturated resins.

Examples of unsaturated resins which are polymerizable with the present compositions are unsaturated polyester resins and vinylester resins as described in U.S. Pat. Nos. 3,367,992, 3,564,074 and 3,594,247, polybutadiene and polyisoprene, styrene/butadiene copolymers and the like.

Polymerization is accomplished by a free radical mechanism i.e. using free radical catalysts, including initiation by electron and ultraviolet irradiation.

The above thermosetting resins can be blended with an ethylenically unsaturated monomer mixture copolymerizable with the unsaturated polymers. The mixture comprises vinyl aromatic monomers such as styrene, alpha-methyl styrene, chlorostyrene, vinyl toluene, divinyl benzene, and diallyl phthalate with about 5 to about 90 weight percent of the brominated compositions of this invention.

The thermosetting blends with the unsaturated monomer mixture should contain 20 to about 70 percent by weight and preferably 30 to 50 percent by weight of the monomer mixture based on the weight of the resin. A small amount of inhibitor such as TBC, hydroquinone, or the like is added to this mixture. The amount added is generally in the range from about 50-300 parts per million based on the amount of unsaturated monomer.

The final blend is a crosslinkable resin composition which is useful to make laminates.

Laminates are made by mixing into the crosslinkable composition free radical forming catalysts and adding this mixture to a suitable fibrous substrate such as asbestos fibers, carbon fibers, fibrous glass, or inorganic fibers. Examples of these catalysts are benzoyl peroxide, tertiary butyl peroxide, methylethylketone peroxide and the like. It is also of value to add accelerators such as cobalt naphthenate, dimethyl aniline, and the like.

The crosslinkable composition is rolled, sprayed or impregnated into the fibrous reinforcement such as fibrous glass and cured in a manner well known in the art. When fibrous glass is used, it can be in any form such as chopped strands, filaments, glass ribbons, glass yarns, or reinforcing mats.

DETAILED DESCRIPTION OF THE INVENTION

The following examples are presented to illustrate but not to limit the invention.

PREPARATION 1

Batch Preparation of CAC

To a five liter flask maintained under a nitrogen pad and fitted with overhead mechanical stirring was added 720.6 g of acrylic acid, 0.11 g of hydroquinone monomethyl ether (MEHQ) and 17.7 g of $BF_3$ etherate. With stirring 34.0 g of DCPD (Exxon 97 DCP) was added slowly while the temperature of the reactor was raised to 50° C. Over a 34.5 hour period, 647.5 additional grams of DCPD was added at a rate of 0.31 ml/min. After 21½ hours, another 0.22 g of MEHQ was added. After all the DCPD was added, the reactor temperature was raised to and held at 70° C. for three hours. The reaction product was transferred to a large bottle which was placed in a water bath at ~75° C. To the bottle was added an equal volume of deionized water which had been heated to 75° C. Using a motor driven stirrer, the contents of the bottle were agitated for about two minutes. The contents of the bottle were poured into two liter separating funnels, the phases allowed to separate, and the oil phases collected. The washing procedure was repeated four more times. The washing oil phase was transferred to a two liter round bottom flask. The flask was placed under a vacuum of two torr and stirred magnetically at room temperature overnight. To the dried CAC product was added 0.28 g of MEHQ. The final product had a Gardner color of 8–9 and a viscosity of 15.4 cps at 25° C. The material analyzed as 92.0% DCPDA, 6.4% polycyclopentenyl acrylates and DCPDdiacrylate, 2.3% polymer and 0.8% residual acidity.

PREPARATION 2

Preparation of High Purity DCPDA by Wiped Film Distillation

CAC compositions prepared as described in Preparation 1 were distilled with a laboratory scale (2 ft$^2$) wiped film evaporator. While maintaining the exterior wall temperature at 145° C. and the vacuum at 5.2 torr, CAC was pumped to the evaporator at 22.4 ml/min. Under these operating conditions, the overhead cut was 48% of the feed. The water white DCPDA was determined to be >98% pure by gas chromatography.

CONTROL 1

Solution Bromination (stoichiometric) of Dicyclopentadienyl Acrylate with Liquid Bromine A solution of 200 g (0.98 mole) of DCPDA (98.7% pure) (as prepared in Preparation 2) in 300 g of $CH_2Cl_2$ was placed in a five neck, one liter, round bottom flask equipped with overhead stirrer, thermometer, drying tube, addition funnel modified so that bromine is added below the liquid surface and stopper. The contents of the flask was cooled to −20° C. To the addition funnel was added 156 g (0.98 moles) of $Br_2$ which was added dropwise over a period of 22 minutes to the constantly stirred solution which was maintained at −20° C. After all of the bromine was added, stirring was continued for 70 minutes at −20° C. After this period of time 200 ppm (based on theoretical yield of 356 g of product) of TBC, 1% styrene, and 1% t-butyl glycidyl ether were added to the reaction solution. The solvent was removed under vacuum at 55° C. to yield 366 g of 2,3 dibromodicyclopentadienyl acrylate having a Gardner color of 1–3.

EXAMPLE 1

Solution Bromination (stoichiometric) of Cycloaliphatic Acrylate Composition with Liquid Bromine The procedure in Control 1 was repeated using 200 g (0.91–0.94 equivalents of cycloolefinic double bonds) CAC (as prepared in Preparation 1) and 150 g (0.94 mol) of bromine. The reaction yielded 350 g of product having Gardner color 10.

CONTROL 2

Solution Bromination (8 mole % excess) of Dicyclopentadienyl Acrylate with Liquid Bromine A solution of 612 g (2.96 mole) of DCPDA (98.7% pure) in 1836 ml of $CH_2Cl_2$ was placed in a three neck, three liter, round bottom flask equipped with overhead stirrer, thermometer, drying tube, and addition funnel. The contents of the flask were cooled to 0° C. To the addition funnel was added 518.4 g (3.24 moles) of $Br_2$ which was added dropwise over a period of 22 minutes to the constantly stirred solution which was maintained at 0° C. After all the bromine was added, stirring was continued for 45 minutes at 0° C. Then 90.6 g of Filtrol ® clay (Grade 13) was added. The suspension was stirred for 15 minutes at 0° C. The Filtrol ® clay was removed by filtration through Celite ® 545 (a commercial brand of diatomaceous earth). The solution was inhibited with 0.23 g (200 ppm) TBC and 11.3 g (1 wt. %) of styrene. After vacuum stripping (1–2 torr) at 45° C., a viscous liquid having less than Gardner 1 color was obtained.

Infrared (IR) and proton magnetic resonance (PMR) spectra of the product revealed the bulk of the components were acrylates. Gas chromatography-mass spectrometry (gc-ms) was utilized to obtain the masses of the major products of the reaction. The four reaction products present in the highest concentration had masses of 362 ($C_{13}H_{16}O_2Br_2$), 440 ($C_{13}H_{15}O_2Br_3$), 442 ($C_{13}H_{17}O_2Br_3$), and 520 ($C_{13}H_{16}O_2Br_4$). The following structures for the major component (mass 362) and the three minor components (masses 440, 442, and 520) were assigned on the basis of the mass spectral data and rational reaction pathways.

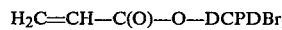

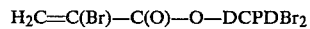

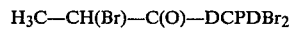

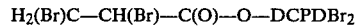

where DCPDBr$_2$ has the structure

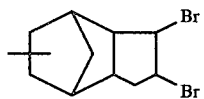

EXAMPLE 2

Bromination (8 mole % excess) of a CAC in Solution with Liquid Bromine

A 612 g (~3 equivalents of cyclopentene double bonds) of a CAC sample (89.9% DCPDA) was added to 1836 ml CH$_2$Cl$_2$ in a 3 neck 3 liter flask equipped with an overhead stirrer, thermometer, drying tube and addition funnel. The flask contents were cooled to 0° C. To the addition funnel was added 518.4 g of liquid bromine. The Br$_2$ was added dropwise over a period of 45 minutes to the constantly stirred solution which was maintained at 0° C. After all of the Br$_2$ was added, stirring was continued for 45 minutes at 0° C. Then 90.6 g of Filtrol® clay (Grade 13) was added and the slurry stirred for 15 minutes at 0° C. The product solution was filtered over Celite 545® and inhibited with 0.23 g (200 ppm) TBC and 11.3 g (1 wt. %) styrene. Vacuum stripping at 45° C. for 55 minutes gave a brominated CAC with color intensity of 12 on the Gardner scale. The product obtained in this reaction had spectral properties very similar to those found for the product from Example 1.

EXAMPLE 3

Bromination (8 mole % excess) of CAC Synthesized from a DCPD Concentrate (~80% DCPD)

The procedure of Example 2 was repeated on a CAC having 79.9% DCPDA, 11.1% heavy acrylates, 1.1% DCPD, and the remainder a mixture of the copolymers of acrylic acid with adducts of cyclopentadiene with isoprene, piperylene, methylcyclopentadiene or mixtures thereof (prepared in a manner similar to Preparation 1). After isolation, the product was analyzed by IR and PMR. The results of spectral analysis indicate the product is very similar to material produced in Example 2.

EXAMPLE 4

Bromination (8% mole excess) of a Cycloaliphatic Methacrylate Composition in Solution with Liquid Bromine To a three neck round bottom flask equipped for overhead stirring and fitted with a thermometer and a pressure compensated addition funnel was added 30 g of CMC (93% dicyclopentadienyl methacrylate (DCPDMA), 7% heavy acrylates (prepared in a similar manner to Preparation 1 employing methacrylic acid in place of acrylic acid) and 90 ml of CH$_2$Cl$_2$. The contents of the flask were cooled to 0° C. and maintained at that temperature while 23.8 g of Br$_2$ was added dropwise. After the addition of the bromine was completed, the reaction solution was stirred at 0° C. for 0.5 hour. Then 4.3 g of Filtrol® Grade 13 clay was added to the reactor and the suspension stirred at 0° C. for 0.25 hour. The clay was removed by filtration, and the dark colored filtrate was passed over a short column of alumina. To inhibit polymerization, 50 mg of TBC was added to the solution. The solution was concentrated under vacuum (1-2 torr) at 45° C. The dark amber product from this reaction had IR and PMR spectral properties consistant with those for a methacrylate and had chromatographic characteristics very similar to the material produced in Example 3.

EXAMPLE 5

Stoichiometric Bromination of a Cycloaliphatic Acrylate Composition (CAC) in Solution with a Solution of Bromine To a 3 liter, 4 neck flask fitted with overhead stirrer, thermometer, 500 ml pressure compensated addition funnel, and nitrogen purge was added 500 g (2.3 equivalents of cyclopentene double bonds) of CAC (88.0% DCPDA and 10.9% heavier acrylates) and 250 ml of methylene chloride. The reaction temperature was maintained at −20° C. during dropwise addition of 359.2 g (2.25 mol) of bromine in 250 ml of methylene chloride.

The honey colored product was washed with three portions of water, dried over anhydrous magnesium sulfate, and concentrated. During drying, the solution turned dark olive in color. The product oil was dissolved in pentane, treated with decolorizing charcoal, and filtered. The filtrate was concentrated to yield a transparent brown liquid which had spectral properties similar to those of the material prepared in Example 2.

CONTROL 3

Stoichiometric Bromination of DCPDA without Solvent Using Bromine Vapor

Into a 100 ml four neck round bottom flask equipped for overhead stirring and fitted with a thermometer, a fritted gas inlet tube, and an exhaust vent is placed 44.19 g (0.21 moles based on 98% purity) of DCPDA. Into a vaporizing chamber is weighed 33.3 g (0.21 mole) of Br$_2$. Nitrogen gas flowing at 40 ml/minute is passed into the vaporizer. The nitrogen stream saturated with bromine vapor is purged into the reactor. During addition of the bromine vapor the reactor temperature is maintained at 10°-40° C. After all of the bromine has been transferred to the reactor, stirring is continued until a viscous straw colored product is obtained. Analysis by gas chromatography shows that 86% of the DCPDA was converted and the area ratio of dibromo ester to tetrabromo ester is about 10. When inhibited, the product shows excellent shelf life and color stability.

EXAMPLE 6

Neat Bromination of CAC with Bromine Vapor

A 500 ml round bottom flask fitted with overhead stirring and a feed tube inserted to the bottom of the reactor was charged with 200 g of CAC. While maintaining the temperature between 15°–18° C., bromine vapor entrained in $N_2$ flowing at 23 liters/hr was fed to the reactor over a four hour period. To facilitate vaporization of the bromine, the vessel containing it was heated to a temperature between 40° and 66° C. A total of 165 g of bromine was passed into the reactor in this manner. Analysis by gas chromatography revealed a large amount of unreacted CAC and considerable amounts of tri- and tetrabromo products along with the desired dibromo acrylate.

EXAMPLE 7

Comparison of Hardness Development Rate in Glass Laminates Formulated with a Mixture of Brominated DCPDA (Control 1) and Brominated CAC (Example 1) having approximately 2 Bromine atoms per Equivalent of Cyclopentene To compare the hardness development rate in glass laminates prepared from polyester formulated with brominated DCPDA of Control 1 to that of brominated CAC of Example 1 two fiber glass laminates were laid up with a curable formulation made from 45% polyester resin (a commercial resin made from one mol phthalic anhydride, one mol of maleic anhydride and two mols of propylene glycol), 27.5% brominated acrylate, and 27.5% styrene. The two laminates which contained 25 percent by weight fiber glass were prepared identically. The curing catalyst was 1.5 wt. % methyl ethyl ketone peroxide promoted with 0.2 wt. % cobalt napthenate and 0.1 wt. % N,N-dimethylaniline. One of the glass laminates was made with the brominated DCPDA prepared in Control 1. The other with brominated CAC prepared in Example 1.

As shown in Table I the brominated CAC based polyester showed an unexpectedly faster hardness development rate than did the polyester formulated with brominated DCPDA. After 2 hours the brominated CAC laminate had a Barcol hardness of 17 as compared to 11 for the brominated DCPDA laminate. After one day the brominated CAC based laminate measured a hardness of 44 while the brominated DCPDA laminate required two days to attain a hardness of 45.

TABLE I

Hardness Development Rate for Polyester Glass Laminates Formulated with Brominated CAC and Brominated DCPDA.

| | Barcol Hardness | |
|---|---|---|
| Time | Example 1 Laminate | Control 1 Laminate |
| 2 hours | 17 | 11 |
| 3 hours | 26 | 18 |
| 4 hours | 26 | 19 |
| 5 hours | 27 | 23 |
| 6 hours | 31 | 24 |
| 7 hours | 31 | 24 |
| 8 hours | 32 | 30 |
| 1 day | 44 | 38 |
| 2 days | 45 | 45 |
| 3 days | 46 | 46 |

TABLE I-continued

Hardness Development Rate for Polyester Glass Laminates Formulated with Brominated CAC and Brominated DCPDA.

| | Barcol Hardness | |
|---|---|---|
| Time | Example 1 Laminate | Control 1 Laminate |
| 4 days | 46 | 46 |
| 5 days | 46 | 46 |
| 6 days | 46 | 46 |
| 7 days | 47 | 47 |

EXAMPLE 8

Comparison of Brominated DCPDA and Brominated CAC in U.V. Applications

In side-by-side comparisons, films formulated with 40% by weight of a commercial vinyl ester resin, and 60% brominated CAC showed better adhesion than films formulated with the same vinyl ester resin and brominated DCPDA.

To each of the formulations to be tested was added 5% by weight of photo initiator, a 3:2 solution of diethoxyacetophenone and methyl diethanol amine. The films were laid on aluminum panels with a #4 wire rod and cured at 200 ft/min under a 200 watts per inch mercury arc lamp.

The film formulated with brominated CAC had adhesion values* of 50–90%, while the film formulated with brominated DCPDA had adhesion values of only 10–50%.

*A razor blade was used to score the film at 1/16 of an inch intervals crosswise to yield a grid of 100 squares 1/16" on a side. A pressure sensitive tape was then applied and quickly pulled away, the percent of the film remaining on the panel is reported as the percent adhesion.

EXAMPLE 9

Comparisons of Castings and Laminates made with Brominated CAC and Brominated DCPDA Fiber glass laminates, made by the method set forth in Example 7, and clear castings, made by pouring the resin and catalysts into a mold, curing thermally and cutting a test strip therefrom, were prepared with formulations of the polyester resin used in Example 8, styrene, and brominated DCPDA or brominated CAC. Properties of the laminates and castings were measured to determine the effect of brominated CAC vs. brominated DCPDA. The physical properties measured were tensile strength, elongation, flexural yield strength, flexural elastic modulus, hardness, and heat distortion. The chemical properties of S.P.I. gel and cure times and maximum exotherm were also determined for the formulations. Finally, the values, L.O.I., UL-94, and flame spread, which are indicative of flame resistant* properties were obtained.

*References to flame resistant materials or flame retardants are based on laboratory scale tests which are not meant to reflect hazards presented by this or any other material under actual fire conditions.

The comparison showed that the laminates and castings prepared from brominated CAC perform as well as those made from brominated DCPDA but they have the additional advantage of faster hardness development as pointed out in Table I.

We claim:

1. A brominated cycloaliphatic (meth) acrylate composition which comprises the reaction product of bromine with a cycloaliphatic (meth) acrylate composition wherein the reaction takes place at a temperature in the range from −30° to 50° C. in the presence of an inert solvent wherein the mol ratio of bromine per mol of cycloaliphatic unsaturation is in the range from 1:1 to 1.1:1 and wherein said composition has (A) about 60 to 95 percent by weight of dicyclopentadienyl acrylate, dicyclopentadienyl methacrylate, or mixtures thereof, (B) about 2 to 15 percent by weight of a mixture of polycyclopentenyl acrylates of the formula

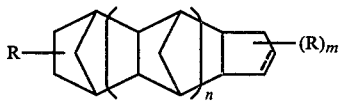

where
R is $CH_2=C(Z)-C(O)-O-$
Z is H, or methyl
n is 1, or 2
m is 0 or 1 and when m is 0 there is a double bond present in the cyclopentyl group, (C) about 0.5 to about 21 percent by weight of a mixture of the copolymers of methacrylic acid or acrylic acid with adducts of cyclopentadiene with isoprene, piperylene methylcyclopentadiene, or mixtures thereof, (D) about 0.05 to 10 weight percent of a mixture of polyacrylates having the repeating unit:

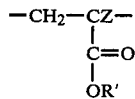

where
R' is hydrogen or

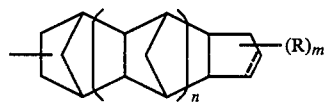

R is $CH_2=CZ-C(O)-O-$, Z is hydrogen or methyl, n is 0, 1 or 2. and m is 0 or 1, and when m is 0, there is a double bond present in the cyclopentyl group, wherein said reaction product has substantially all the original acrylic unsaturation, substantially no remaining cycloolefinic unsaturation and has 1 to 4 bromine atoms attached to the original cyclopentene ring and to the acid moiety.

2. The composition of claim 1 which contains 70 to 90 percent by weight of A, 5 to 15 percent by weight of B, 0.5 to 15 percent by weight of C, and 0.05 to 5 percent by weight of D.

3. The composition of claim 1 wherein the reaction takes place in the presence of an inert halogenated solvent.

* * * * *

UNITED STATES PATENT AND TRADEMARK OFFICE
CERTIFICATE OF CORRECTION

PATENT NO. : 4,345,048

DATED : August 17, 1982

INVENTOR(S) : Hans R. Friedli and Clinton J. Boriack

It is certified that error appears in the above—identified patent and that said Letters Patent is hereby corrected as shown below:

Col. 1, line 14, change "concentrations" to --concentrates--.

Col. 1, line 15, change "methacylic" to --methacrylic--.

Col. 1, line 20, change "inefficent" to --inefficient--.

Col. 2, line 27, change "dicyclopentadinyl" to --dicyclopentadenyl--.

Col. 3, line 45, change the word "of" to --or--.

Col. 4, line 15, add the word --the-- before the word use.

Col. 5, line 59, change "washing" to --washed--.

Col. 6, line 24, change "was" to --were--.

Col. 7, line 18, in the formula add -O- before $DCPDBr_2$.

Col. 8, line 26, change "sistant" to --sistent--.

Signed and Sealed this

Twenty-eighth Day of December 1982

[SEAL]

Attest:

Attesting Officer

GERALD J. MOSSINGHOFF

Commissioner of Patents and Trademarks